US009565605B1

(12) United States Patent
Yang et al.

(10) Patent No.: US 9,565,605 B1
(45) Date of Patent: Feb. 7, 2017

(54) SMALL CELL, MACRO CELL AND TRANSMISSION ASSIST METHOD FOR SMALL CELL

(71) Applicant: Institute For Information Industry, Taipei (TW)

(72) Inventors: Feng-Ming Yang, Taipei (TW); Yi-Hsueh Tsai, New Taipei (TW); Shu-Han Liao, New Taipei (TW)

(73) Assignee: Institute For Information Industry, Taipei (TW)

( * ) Notice: Subject to any disclaimer, the term of this patent is extended or adjusted under 35 U.S.C. 154(b) by 0 days.

(21) Appl. No.: 15/058,148

(22) Filed: Mar. 1, 2016

(30) Foreign Application Priority Data

Feb. 2, 2016 (TW) .............................. 105103249 A

(51) Int. Cl.
| | | |
|---|---|---|
| *H04W 36/00* | (2009.01) | |
| *H04W 36/08* | (2009.01) | |
| *H04W 36/22* | (2009.01) | |
| *H04W 84/04* | (2009.01) | |

(52) U.S. Cl.
CPC ......... *H04W 36/08* (2013.01); *H04W 36/0022* (2013.01); *H04W 36/22* (2013.01); *H04W 84/045* (2013.01)

(58) Field of Classification Search
CPC .. H04W 76/025; H04W 76/046; H04W 76/06; H04W 76/064; H04W 72/042; H04W 72/0413; H04W 72/1263; H04W 72/048; H04W 72/082; H04W 72/0426; H04W 84/00; H04W 84/12; H04W 88/06; H04W 88/10;H04W 36/04; H04W 36/22; H04W 36/0033; H04W 36/08; H04W 36/18; H04W 28/08; H04W 16/32; H04W 16/16
USPC ................ 455/436–444, 423–425, 450–454, 67.11,455/115.1–115.4, 226.1–226.4
See application file for complete search history.

(56) References Cited

U.S. PATENT DOCUMENTS

| | | | |
|---|---|---|---|
| 2010/0267378 A1* | 10/2010 | Hamabe ................ | H04W 24/10 455/423 |
| 2010/0330920 A1* | 12/2010 | Koskela ................ | H04L 1/1854 455/67.11 |
| 2015/0029835 A1* | 1/2015 | Zhang ................... | H04W 24/04 370/225 |
| 2015/0245232 A1 | 8/2015 | Luo et al. | |

(Continued)

*Primary Examiner* — Allahyar Kasraian
(74) *Attorney, Agent, or Firm* — Skaar Ulbrich Macari, P.A.

(57) ABSTRACT

A small cell, a macro cell and a transmission assist method are provided. The small cell includes a transceiver and a processor. The processor generates a radio link failure (RLF) indication message when determining that an RLF count in a licensed band between the small cell and a user equipment reaches a threshold. The transceiver transmits the RLF indication message to the macro cell, and receives a modification request message from the macro cell. The modification message includes resource configuration information, and the resource configuration information indicates an unlicensed band radio resource of an unlicensed band. After confirming via the transceiver that the unlicensed band radio resource is available for data transmission with the user equipment, the processor generates a modification request acknowledge message, and transmits the modification request acknowledge message to the macro cell via the transceiver.

13 Claims, 5 Drawing Sheets

(56) References Cited

U.S. PATENT DOCUMENTS

| | | | |
|---|---|---|---|
| 2016/0037579 A1* | 2/2016 | Jung | H04W 24/04 370/252 |
| 2016/0112924 A1* | 4/2016 | Turakhia | H04W 36/30 370/332 |
| 2016/0198481 A1* | 7/2016 | Kikuchi | H04W 16/10 455/452.2 |
| 2016/0219475 A1* | 7/2016 | Kim | H04W 76/025 |
| 2016/0234739 A1* | 8/2016 | Puddle | H04W 36/0055 |
| 2016/0249255 A1* | 8/2016 | Khawer | H04W 36/0005 |

\* cited by examiner

SMALL CELL, MACRO CELL AND TRANSMISSION ASSIST METHOD FOR SMALL CELL

PRIORITY

This application claims the benefit of priority based on Taiwan Patent Application No. 105103249 filed on Feb. 2, 2016, which is hereby incorporated by reference in its entirety.

FIELD

The present invention relates to a small cell, a macro cell and a transmission assist method for the small cell. More particularly, the present invention provides an unlicensed band resource request and configuration mechanism that allows the small cell to perform data transmission with a user equipment through the unlicensed band resource.

BACKGROUND

With the rapid development of the mobile communication technology, there is a sharp increase in the use of various mobile communication devices (e.g., intelligent mobile phones, tablet computers or the like) as compared to the past. In order to provide excellent mobile communication services for users, mobile communication operators obtain licensed bands by biding for the licensed bands. Moreover, due to the increasing density of the mobile communication devices in recent years, the mobile communication operators further establish small cells in addition to macro cells to improve the wireless signal quality and enlarge the signal coverage so as to satisfy communication requirements of individual small areas.

When the radio signal interference around the small cell or the user equipment is serious, radio link failure (RLF) may occur between the user equipment and the small cell. To solve this problem, currently specialists and operators in the fourth generation long term evolution (4G LTE) mobile communication field have proposed the use of an unlicensed band to assist in the signal transmission (i.e., the Licensed Assisted Access). However, no agreement has yet been reached on how the small cell requests use of the unlicensed band resources and how the small cell obtains the configuration of the unlicensed band resource.

Accordingly, an urgent need exists in the art to provide an unlicensed band resource request and configuration mechanism based on the current 4G LTE standard so that the small cell performs data transmission with the mobile communication device through the unlicensed band resource.

SUMMARY

An objective of the present invention is to provide an unlicensed band resource request and configuration mechanism, which decides when to use the unlicensed band resource according to a radio link failure (RLF) count in a licensed band between a small cell and a user equipment (i.e., mobile communication device) and accomplishes the request and configuration of the unlicensed band resource according to specific messages in the current 4G LTE standard.

The disclosure includes a small cell which comprises a transceiver and a processor. The processor is electrically connected to the transceiver and is configured to execute the following operations: determining whether a radio link failure (RLF) count in a licensed band between the small cell and a user equipment reaches a threshold; generating an RLF indication message if the RLF count reaches the threshold, wherein the RLF indication message carries the RLF count; transmitting the RLF indication message to a macro cell via the transceiver; receiving a modification request message from the macro cell via the transceiver, wherein the modification request message includes resource configuration information, and the resource configuration information indicates an unlicensed band radio resource of an unlicensed band; confirming that the unlicensed band radio resource is available for subsequent data transmission with the user equipment via the transceiver; and after confirming that the unlicensed band radio resource is available for the subsequent data transmission with the user equipment, generating a modification request acknowledge message and transmitting the modification request acknowledge message to the macro cell via the transceiver.

The disclosure also includes a transmission assist method for a small cell. The small cell comprises a transceiver and a processor. The processor is electrically connected to the transceiver. The transmission assist method is executed by the processor and comprises the following steps of: (a) determining whether an RLF count in a licensed band between the small cell and a user equipment reaches a threshold; (b) generating an RLF indication message if the RLF count reaches the threshold, wherein the RLF indication message carries the RLF count; (c) transmitting the RLF indication message to a macro cell via the transceiver; (d) receiving a modification request message from the macro cell via the transceiver, wherein the modification request message includes resource configuration information, and the resource configuration information indicates an unlicensed band radio resource of an unlicensed band; (e) confirming via the transceiver that the unlicensed band radio resource is available for subsequent data transmission with the user equipment; and (f) after confirming that the unlicensed band radio resource is available for the subsequent data transmission with the user equipment, generating a modification request acknowledge message and transmitting the modification request acknowledge message to the macro cell via the transceiver.

The disclosure further includes a macro cell which comprises a transceiver and a processor. The processor is electrically connected to the transceiver and is configured to execute the following operations: receiving an RLF indication message from a small cell via the transceiver, wherein the RLF indication message is generated by the small cell when determining that an RLF count in a licensed band between the small cell and a user equipment reaches a threshold and the modification request acknowledge message carries the RLF count; selecting an unlicensed band radio resource of an unlicensed band according to the RLF indication message and generating a modification request message, wherein the modification request message includes resource configuration information, and the resource configuration information indicates the unlicensed band radio resource of the unlicensed band; transmitting the modification request message to the small cell via the transceiver; and receiving a modification request acknowledge message from the small cell, wherein the modification request acknowledge message is generated by the small cell when confirming that the unlicensed band radio resource is available for subsequent data transmission with the user equipment.

The detailed technology and preferred embodiments implemented for the subject invention are described in the following paragraphs accompanying the appended drawings for people skilled in this field to well appreciate the features of the claimed invention.

DETAILED DESCRIPTION

In the following description, the present invention will be explained with reference to example embodiments thereof. The present invention relates to a small cell, a macro cell and a transmission assist method for the small cell. It shall be appreciated that, these example embodiments are not intended to limit the present invention to any specific embodiment, example, environment, applications or implementations described in these example embodiments. Therefore, description of these example embodiments is only for purpose of illustration rather than to limit the present invention, and the scope claimed in this application shall be governed by the claims.

Additionally, in the following embodiments and the attached drawings, elements unrelated to the present invention are omitted from depiction; and dimensional relationships among individual elements in the attached drawings are illustrated only for ease of understanding, but not to limit the actual scale.

Figure 1A:
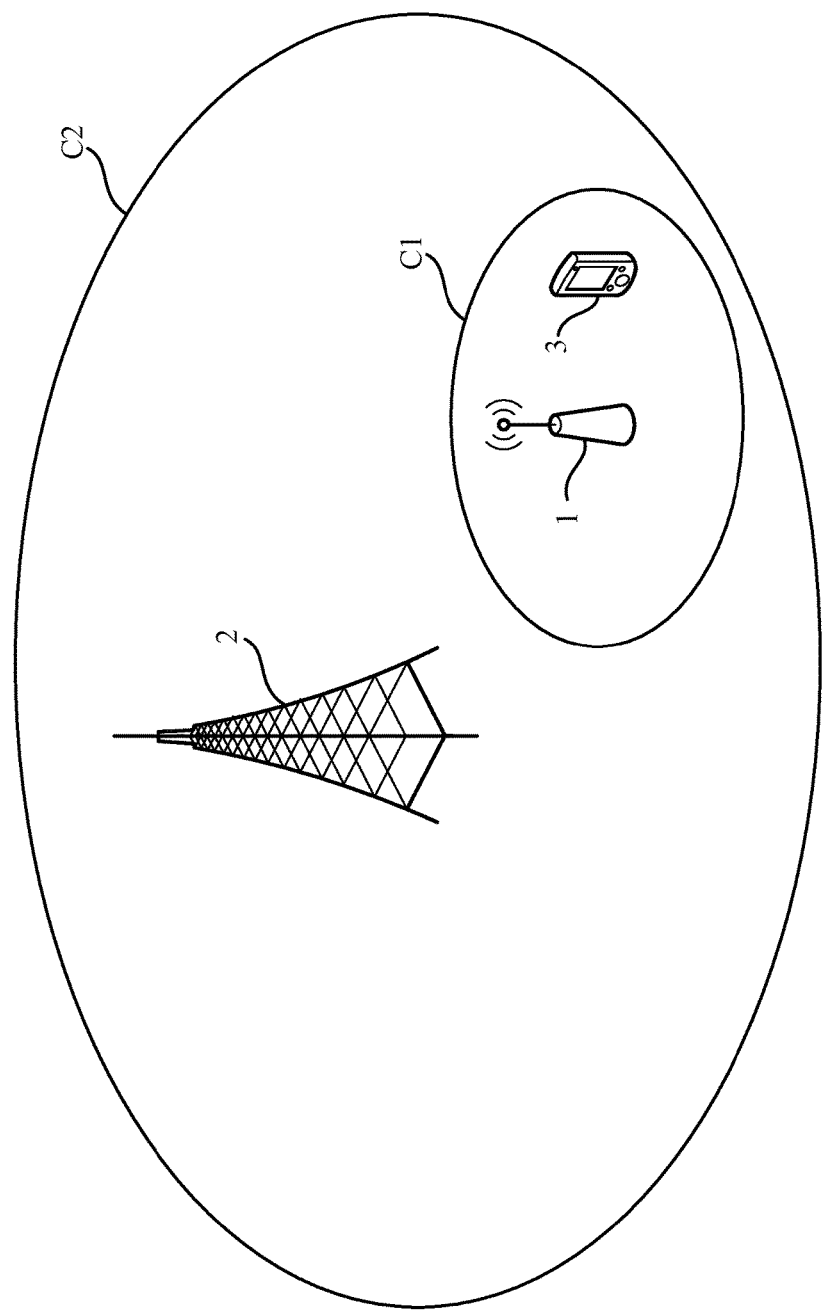
FIG. 1A depicts an implementation of a small cell 1, a macro cell 2 and a user equipment 3 of the present invention.
Figure 1B:
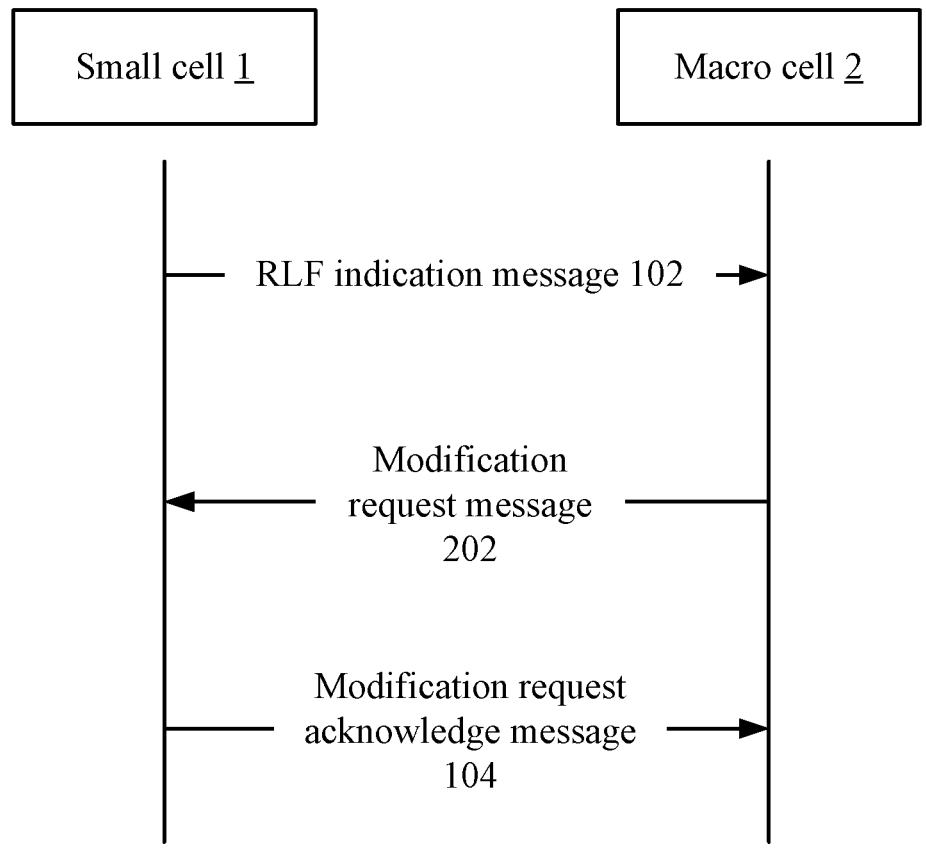
FIG. 1B depicts message transmission between the small cell 1 and the macro cell 2 of the present invention.

A first embodiment of the present invention is as shown in FIG. 1A and FIG. 1B. FIG. 1A depicts an implementation of a small cell 1, a macro cell 2 and a user equipment 3 of the present invention. FIG. 1B depicts message transmission between the small cell 1 and the macro cell 2. As shown in FIG. 1A, the small cell 1 has a signal coverage C1, and the macro cell 2 has a signal coverage C2. The small cell 1 is located within the signal coverage C2 of the macro cell 2, and the user equipment 3 is located within the signal coverage C1 of the small cell 1.

It shall be appreciated that, in FIG. 1A, the signal coverage C1 of the small cell 1 is completely included in the signal coverage C2 of the macro cell 2. However, as shall be readily appreciated by those of ordinary skill in the art, the present invention is applicable as long as the small cell 1 is located within the signal coverage C2 of the macro cell 2, and it is unnecessary for the signal coverage C1 of the small cell 1 to be completely included in the signal coverage C2 of the macro cell 2. Thus, the implementation depicted in FIG. 1A is not intended to limit the implementation of the present invention. The small cell 1, the macro cell 2 and the user equipment 3 are adapted for use in a wireless communication system, e.g., a 4G LTE wireless communication system.

The small cell 1 transmits signals to the user equipment 3 by using a licensed band. In a case that the radio signal interference around the small cell 1 or the user equipment 3 is serious, radio link failure (RLF) may occur between the small cell 1 and the user equipment 3. However, the small cell 1 can determine whether the RLF occurs between the small cell 1 and the user equipment 3 based on an RLF report message transmitted by the user equipment 3 or the action of attempting to recover the radio link by the user equipment 3. The present invention is different from the prior art in that, if the small cell 1 determines that the RLF occurs in the present invention, then the small cell 1 further counts the times that the RLF continuously occurs and determines whether the RLF count reaches a threshold.

If the small cell 1 determines that the RLF count in the licensed band between the small cell 1 and the user equipment 3 reaches the threshold, then the small cell 1 generates an RLF indication message 102. The RLF indication message 102 carries the RLF count. Next, the small cell 1 transmits the RLF indication message 102 to the macro cell 2. Thereafter, the macro cell 2 transmits a modification request message 202 to the small cell 1. The modification request message 202 includes resource configuration information. The resource configuration information indicates an unlicensed band radio resource of an unlicensed band. Thereafter, the small cell 1 determines whether the unlicensed band radio resource is available for subsequent data transmission with the user equipment 3. Next, the small cell 1 generates a modification request acknowledge message 104 and transmits the modification request acknowledge message 104 to the macro cell 2 after confirming that the unlicensed band radio resource is available for subsequent data transmission with the user equipment.

Further speaking, since the RLF occurs in the licensed band between the user equipment 3 and the small cell 1, the small cell 1 needs to find other available radio resources for subsequent data transmission between the small cell 1 and the user equipment 3. In this case, because the small cell 1 of the present invention is controlled by the macro cell 2, the small cell 1 requests the macro cell 2 to configure the unlicensed band radio resource of the unlicensed band by transmitting the RLF indication message 102 to the macro cell 2. After receiving the modification request message 202 from the macro cell 2, the small cell 1 may trigger a listen before talk (LBT) procedure to confirm that the unlicensed band radio resource indicated by the macro cell 2 is in an available state according to the resource configuration information in the modification request message 202. Next, after confirming that the unlicensed band radio resource is available and transmitting the modification request acknowledge message 104 to the macro cell 2, the small cell 1 can use the unlicensed band radio resource for subsequent data transmission with the user equipment 3.

Figure 2:
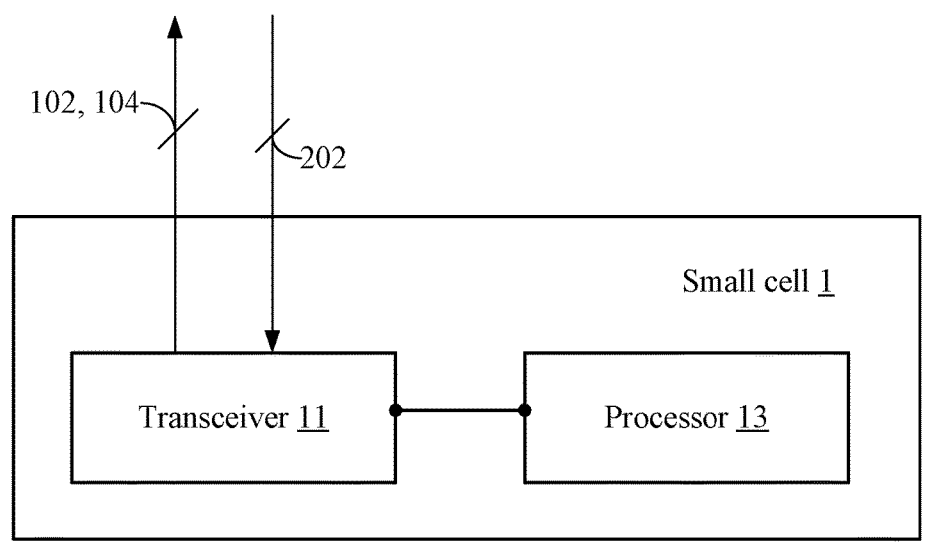
FIG. 2 is a schematic view of the small cell 1 of the present invention.
Figure 3:
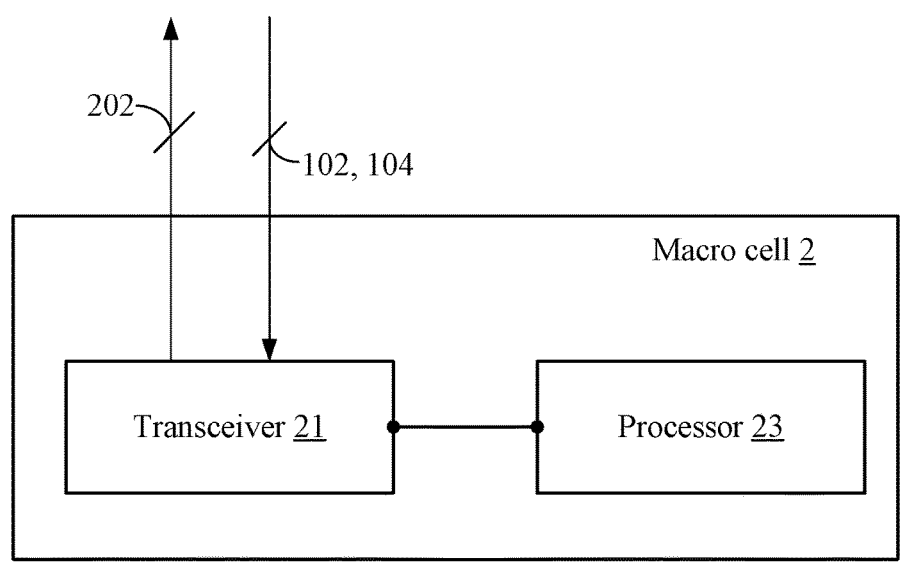
FIG. 3 is a schematic view of the macro cell 2 of the present invention.

A second embodiment of the present invention is as shown in FIG. 2 and FIG. 3. FIG. 2 is a schematic view of the small cell 1 of the present invention. The small cell 1 comprises a transceiver 11 and a processor 13. The processor 13 is electrically connected to the transceiver 11. The processor 13 is configured to determine whether an RLF count in a licensed band between the small cell 1 and the user equipment 3 reaches a threshold. When the RLF count reaches the threshold, the processor 13 generates the RLF indication message 102.

After generating the RLF indication message 102, the processor 13 transmits the RLF indication message 102 to the macro cell 2 via the transceiver 11. Next, the processor 13 receives the modification request message 202 from the macro cell via the transceiver 11. As described earlier, the modification request message includes resource configuration information to indicate an unlicensed band radio resource of an unlicensed band. Accordingly, the processor 13 determines 11 whether the unlicensed band radio resource is available for subsequent data transmission with the user equipment 3 via the transceiver. After confirming that the unlicensed band radio resource is available for subsequent data transmission with the user equipment 3, the processor 13 generates a modification request acknowledge message 104 and transmit the modification request acknowledge message 104 to the macro cell 2 via the transceiver 11.

FIG. 3 is a schematic view of the macro cell 2 of the present invention. The macro cell 2 comprises a transceiver 21 and a processor 23. The processor 23 is electrically connected to the transceiver 21. The processor 23 receives the RLF indication message 102 from the small cell 1 via the transceiver 21. Next, the processor 23 configures the unlicensed band radio resource of the unlicensed band and generates the modification request message 202 according to the RLF indication message 102. Specifically, the RLF indication message 102 records the RLF count in the licensed band between the small cell 1 and the user equipment 3 served by the small cell 1. The RLF count equals to a preset threshold set by a backhaul network of the wireless communication system.

The macro cell 2 can learn from the RLF indication message 102 that there is serious interference to the licensed spectrum radio resource currently used for the data transmission between the small cell 1 and the user equipment 3 and thus the licensed spectrum radio resource cannot be used. Accordingly, the processor 23 configures the unlicensed band radio resource of the unlicensed band for subsequent data transmission between the small cell 1 and the user equipment 3, and generates the modification request message 202. As described earlier, the modification request message 202 comprises the resource configuration information to indicate the unlicensed band radio resource of the unlicensed band configured by the macro cell 2.

After generating the modification request message 202, the processor 23 transmits the modification request message 202 to the small cell 1 via the transceiver 21. Then, after the small cell 1 confirms that the unlicensed band radio resource is available for subsequent data transmission with the user equipment 3, the processor 23 further receives the modification request acknowledge message 104 from the small cell 1 and via the transceiver 21.

Please still refer to FIG. 2 for a third embodiment of the present invention. The third embodiment is an extension of the second embodiment. In this embodiment, a licensed band used by the small cell 1 (which is also called a secondary licensed band in this embodiment) is different from another licensed band used by the macro cell 2 (which is also called a primary licensed band in this embodiment). In other words, the wireless communication system configures separate licensed bands for use by the small cell and the macro cell respectively. For example, the primary licensed band used by the macro cell is around 800 MHz, and the secondary licensed band used by the small cell is around 3.5 GHz. Moreover, in this embodiment, after transmitting the modification request acknowledge message 104 to the macro cell 2 via the transceiver 11, the processor 13 further uses the licensed band radio resource of the licensed band and the unlicensed band radio resource of the unlicensed band to perform carrier aggregation (CA) so as to perform subsequent data transmission with the user equipment 3.

Specifically, the data transmission between the small cell 1 and the user equipment 3 is performed through the secondary licensed band of the small cell 1. When the RLF occurs between the small cell 1 and the user equipment 3, it means that the small cell 1 currently cannot effectively use the secondary licensed band to perform the data transmission with the user equipment 3. Accordingly, after the processor 13 of the small cell 1 determines that the RLF count in the secondary licensed band between the small cell 1 and the user equipment 3 reaches the threshold, the processor 13 generates the RLF indication message 102 and transmits the RLF indication message 102 to the macro cell 2 via the transceiver 11.

As described earlier, after receiving the RLF indication message 102, the macro cell 2 configures the unlicensed band radio resource of the unlicensed band for the subsequent data transmission between the small cell 1 and the user equipment 3. Next, the macro cell 2 transmits the modification request message 202 to the small cell 1. The modification request message 202 carries the resource configuration information that indicates the unlicensed band radio resource of the unlicensed band. After receiving the modification request message 202 via the transceiver 11, the processor 13 triggers the LBT procedure to confirm that the unlicensed band indicated by the macro cell 2 is in the available state. When the unlicensed band is in the available state, the processor 13 performs the CA on the licensed band radio resource of the secondary licensed band and the unlicensed band radio resource of the unlicensed band configured by the macro cell 2 so as to perform the subsequent data transmission with the user equipment 3. Accordingly, through the CA, the small cell 1 can use not only the licensed band radio resource of the secondary licensed band but also the unlicensed band radio resource of the unlicensed band configured by the macro cell 2 for the subsequent data transmission with the user equipment 3 to increase the radio resources that can be used for transmission, thereby reducing the impact caused by the failure in use of the licensed spectrum radio resource.

A fourth embodiment of the present invention is also an extension of the second embodiment. Different from the third embodiment, the licensed band of the macro cell 2 is used by the macro cell 2 and the small cell 1 together in this embodiment. In other words, the macro cell 2 configures a licensed band radio resource of the licensed band thereof for use by the small cell 1, and the small cell 1 uses the licensed band radio resource configured by the macro cell 2 to perform the data transmission with the user equipment within the signal coverage of the small cell 1.

In this embodiment, when the small cell 1 uses the licensed band radio resource configured by the macro cell 2 to perform the data transmission with the user equipment 3, the processor 13 determines whether the RLF count in the licensed band radio resource between the small cell 1 and the user equipment 3 reaches the threshold and thereby generates the RLF indication message 102. After the RLF indication message 102 is generated, the processor 13 transmits the RLF indication message 102 to the macro cell 2 via the transceiver 11.

Different from the third embodiment, the processor 23 of the macro cell 2 not only configures the unlicensed band radio resource of the unlicensed band, but also configures another licensed band radio resource of the licensed band for the subsequent data transmission between the small cell 1 and the user equipment 3. Therefore, the resource configuration information of the modification request message 202 further indicates another licensed band radio resource of the licensed band. In other words, in this embodiment, because the licensed band radio resource used by the small cell 1 is configured by the macro cell 2, the small cell 1 also requests the macro cell 2 to configure a new licensed band radio resource via the RLF indication message 102 when the licensed band radio resource previously configured cannot be used.

Similarly, after receiving the modification request message 202 via the transceiver 11, the processor 13 triggers the LBT procedure to confirm that the unlicensed band indicated by the macro cell 2 is in the available state. When the unlicensed band is in the available state, the processor 13 generates the modification request acknowledge message 104 and transmits the modification request acknowledge message 104 to the macro cell 2 via the transceiver 13. Next, the processor 13 uses another licensed band radio resource of the licensed band and the unlicensed band radio resource of the unlicensed band to perform the CA so as to perform the subsequent data transmission with the user equipment.

A fifth embodiment of the present invention is also an extension of the second embodiment. In this embodiment, a licensed band of the macro cell 2 is also used by the macro cell 2 and the small cell 1 together, and the macro cell 2 configures the licensed band radio resource of the licensed band for use by the small cell 1. However, different from the fourth embodiment, the user equipment 3 is connected to the small cell 1 and the macro cell 2 at the same time and performs the data transmission by establishing dual connectivity.

Specifically, the macro cell 2 uses a licensed band radio resource of the licensed band (which is called a first licensed band radio resource in this embodiment) to create a radio bearer (which is called a first radio bearer in this embodiment) with the user equipment 3, and the small cell 1 uses another licensed band radio resource configured by the macro cell (which is called a second licensed band radio resource in this embodiment) to create another radio bearer (which is called a second radio bearer in this embodiment) with the user equipment 3. Through the first radio bearer and the second radio bearer, the backhaul network of the wireless communication system can use the dual connectivity technology to perform the data transmission with the user equipment 3 via the macro cell 2 and the small cell 1. The dual connectivity technology is well known in this field, and thus will not be further described herein.

However, the present invention is different from the prior art in that, after the processor 13 of the present invention determines that the RLF count in the first licensed band radio resource between the small cell 1 and the user equipment reaches the threshold, the processor 13 transmits the RLF indication message 102 to request the macro cell 2 to configure the unlicensed band radio resource of the unlicensed band. The resource configuration information carried by the modification request message 202 generated by the macro cell 2 further indicates a quality of service (QoS) class identifier in addition to the unlicensed band radio resource of the unlicensed band. Then, after the modification request message 202 is received via the transceiver 11, the processor 13 also triggers the LBT procedure to confirm that the unlicensed band indicated by the macro cell 2 is in the available state.

When the unlicensed band is in the available state, the processor 13 generates the modification request acknowledge message 104 and transmits the modification request acknowledge message 104 to the macro cell 2 via the transceiver 11. Then, the processor 13 creates a new radio bearer (which is called a third radio bearer in this embodiment) with the user equipment through the unlicensed band radio resource and according to the QoS class identifier. In this way, the macro cell 2 and the small cell 1 can establish dual connectivity with the user equipment 3 by using the first licensed band radio resource of the licensed band and the unlicensed band radio resource of the unlicensed band respectively so as to perform the data transmission. In other words, the backhaul network of the wireless communication system uses the dual connectivity technology to perform the subsequent data transmission with the user equipment 3 via the first radio bearer between the macro cell 2 and the user equipment 3 and via the third radio bearer between the small cell 1 and the user equipment 3. It shall be appreciated that, the QoS class identifier is used as a mechanism for ensuring that the carrier traffic is properly allocated to each QoS in an LTE network system. Each QoS class identifier has a resource category, a priority level, a packet delay budget and a packet loss ratio. For example, if the QoS class identifier indicated by the resource configuration of the modification request message 202 is 3, then the small cell 1 creates with the user equipment a radio bearer, of which the resource category is Guaranteed Bit Rate (GBR), the priority level is 3, the packet delay budget is 50 ms and the packet loss ratio is $10^{-3}$, through the unlicensed band radio resource used by the small cell 1 and according to the QoS class identifier. How the small cell 1 uses the unlicensed band radio resource to create the radio bearer with the user equipment 3 shall be readily appreciated by those of ordinary skill in the art based on the aforesaid description, and thus will not be further described herein.

Figure 4:
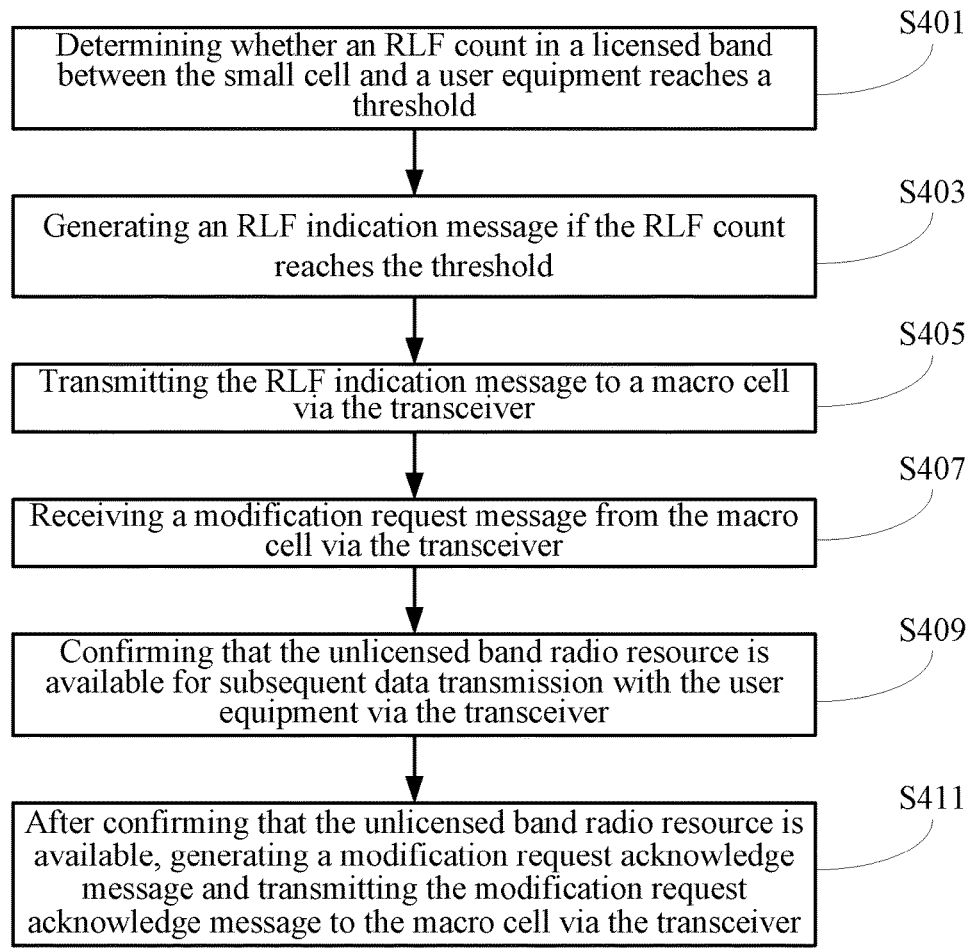
FIG. 4 is a flowchart diagram of a data transmission method according to the present invention.

A sixth embodiment of the present invention is a transmission assist method, and a flowchart diagram thereof is as shown in FIG. 4. The transmission assist method is adapted for use in a small cell (e.g., the small cell 1 of the aforesaid embodiments). The small cell comprises a transceiver and a processor. The processor is electrically connected to the transceiver. The transmission assist method is executed by the processor.

First, in step S401, it is determined whether an RLF count in a licensed band between the small cell and a user equipment reaches a threshold. As described earlier, when the radio signal interference around the small cell or the user equipment is serious, the RLF will occur between the user equipment and the small cell. Next, the processor calculates the RLF count and determines that the RLF count reaches the threshold. Thereafter, in step S403, an RLF indication message is generated when the RLF count reaches the threshold. The RLF indication message carries the RLF count.

In step S405, the RLF indication message is transmitted to a macro cell via the transceiver. Thereafter, the macro cell configures an unlicensed band radio resource of an unlicensed band in response to the RLF indication message. Next, in step S407, a modification request message is received from the macro cell via the transceiver. As described earlier, the modification request message includes resource configuration information. The resource configuration information indicates an unlicensed band radio resource of an unlicensed band. Thereafter, in step S409, it is confirmed via the transceiver that the unlicensed band radio resource is available for subsequent data transmission with the user equipment. Thereafter, in step S411, after it is confirmed that the unlicensed band radio resource is available for subsequent data transmission with the user equipment, a modification request acknowledge message is generated and transmitted to the macro cell via the transceiver.

In other embodiments, when the licensed band used by the small cell is different from another licensed band used by the macro cell, the transmission assist method of the present invention further comprises the following step after the step S411: using the licensed band radio resource of the licensed band and the unlicensed band radio resource of the unlicensed band to perform carrier aggregation (CA) so as to perform the data transmission with the user equipment.

Moreover, in other embodiments, the licensed band is used by the macro cell and the small cell together, i.e., the macro cell configures a licensed band radio resource of the licensed band for use by the small cell. In this case, the step S401 is to determine whether the RLF count in the licensed band radio resource between the small cell and the user equipment reaches the threshold.

Moreover, in an embodiment, the resource configuration information of the modification request message generated by the macro cell in response to the RLF indication message further indicates another licensed band radio resource of the licensed band. In this case, the transmission assist method of the present invention further comprises the following step after the step S411: using the another licensed band radio resource of the licensed band and the unlicensed band radio resource of the unlicensed band to perform carrier aggregation so as to perform the data transmission with the user equipment.

Furthermore, in an embodiment, the resource configuration information of the modification request message generated by the macro cell in response to the RLF indication message further indicates a QoS class identifier. In this case, the transmission assist method of the present invention further comprises the following step after the step S411: creating a radio bearer with the user equipment through the unlicensed band radio resource and according to the QoS class identifier so that the macro cell and the small cell establish dual connectivity with the user equipment by using the licensed band radio resource of the licensed band and the unlicensed band radio resource of the unlicensed band respectively so as to perform the data transmission.

In addition to the aforesaid steps, the transmission assist method of the present invention can also execute all the operations and have all the corresponding functions set forth in all the aforesaid embodiments. How this embodiment executes these operations and has those functions will be readily appreciated by those of ordinary skill in the art based on the explanation of all the aforesaid embodiments, and thus will not be further described herein.

According to the above descriptions, the unlicensed band resource request and configuration mechanism of the present invention can accomplish the request and configuration of the unlicensed band resource according to specific messages in the 4G LTE standard. When the RLF count in the licensed band between the small cell and the user equipment reaches the threshold, the small cell can request the macro cell to configure the unlicensed band resource by transmitting the RLF indication message to the macro cell, and the macro cell can inform the small cell of the resource configuration information of the unlicensed band resource by transmitting the modification request message. In this way, the small cell can determine whether the unlicensed band resource is available and use the unlicensed band resource to perform the data transmission with the user equipment after confirming that the unlicensed band resource is available.

The above disclosure is related to the detailed technical contents and inventive features thereof. People skilled in this field may proceed with a variety of modifications and replacements based on the disclosures and suggestions of the invention as described without departing from the characteristics thereof. Nevertheless, although such modifications and replacements are not fully disclosed in the above descriptions, they have substantially been covered in the following claims as appended.

What is claimed is:

1. A small cell, comprising:
   a transceiver; and
   a processor, being electrically connected to the transceiver, and configured to execute the following operations:
   determining whether a radio link failure (RLF) count in a licensed band between the small cell and a user equipment reaches a threshold;
   generating an RLF indication message if the RLF count reaches the threshold, wherein the RLF indication message carries the RLF count;
   transmitting the RLF indication message to a macro cell via the transceiver;
   receiving a modification request message from the macro cell via the transceiver, wherein the modification request message includes resource configuration information, and the resource configuration information indicates an unlicensed band radio resource of an unlicensed band;
   confirming that the unlicensed band radio resource is available for subsequent data transmission with the user equipment via the transceiver; and
   after confirming that the unlicensed band radio resource is available for the subsequent data transmission with the user equipment, generating a modification request acknowledge message and transmitting the modification request acknowledge message to the macro cell via the transceiver.

2. The small cell of claim 1, wherein the licensed band used by the small cell is different from another licensed band used by the macro cell, and after transmitting the modification request acknowledgement message to the macro cell via the transceiver, the processor further uses a licensed band radio resource of the licensed band and the unlicensed band radio resource of the unlicensed band to perform carrier aggregation (CA) so as to perform the data transmission with the user equipment.

3. The small cell of claim 1, wherein the licensed band is used by the macro cell and the small cell together, the macro cell configures a licensed band radio resource of the licensed band for use by the small cell, and the processor determines whether the RLF count in the licensed band radio resource between the small cell and the user equipment reaches the threshold.

4. The small cell of claim 3, wherein the resource configuration information of the modification request message further indicates another licensed band radio resource of the licensed band, and after transmitting the modification request acknowledge message to the macro cell via the transceiver, the processor further uses the another licensed band radio resource of the licensed band and the unlicensed band radio resource of the unlicensed band to perform carrier aggregation so as to perform the data transmission with the user equipment.

5. The small cell of claim 3, wherein the resource configuration information of the modification request message further indicates a quality of service (QoS) class identifier, and after transmitting the modification request acknowledge message to the macro cell via the transceiver, the processor further creates a radio bearer with the user equipment through the unlicensed band radio resource according to the QoS class identifier so that the macro cell and the small cell establish dual connectivity with the user equipment by using another licensed band radio resource of the licensed band and the unlicensed band radio resource of the unlicensed band respectively so as to perform the data transmission.

6. A transmission assist method for a small cell, the small cell comprising a transceiver and a processor electrically connected to the transceiver, the transmission assist method being executed by the processor and comprising the following steps of:
- (a) determining whether an RLF count in a licensed band between the small cell and a user equipment reaches a threshold;
- (b) generating an RLF indication message if the RLF count reaches the threshold, wherein the RLF indication message carries the RLF count;
- (c) transmitting the RLF indication message to a macro cell via the transceiver;
- (d) receiving a modification request message from the macro cell via the transceiver, wherein the modification request message includes resource configuration information, and the resource configuration information indicates an unlicensed band radio resource of an unlicensed band;
- (e) confirming that the unlicensed band radio resource is available for subsequent data transmission with the user equipment via the transceiver; and
- (f) after confirming that the unlicensed band radio resource is available for the subsequent data transmission with the user equipment, generating a modification request acknowledge message and transmitting the modification request acknowledge message to the macro cell via the transceiver.

7. The transmission assist method of claim 6, wherein the licensed band used by the small cell is different from another licensed band used by the macro cell, and the transmission assist method further comprises the following step after the step (f):
using a licensed band radio resource of the licensed band and the unlicensed band radio resource of the unlicensed band to perform carrier aggregation (CA) so as to perform the data transmission with the user equipment.

8. The transmission assist method of claim 6, wherein the licensed band is used by the macro cell and the small cell together, the macro cell configures a licensed band radio resource of the licensed band for use by the small cell, and the step (a) is to determine whether the RLF count in the licensed band radio resource between the small cell and the user equipment reaches the threshold.

9. The transmission assist method of claim 8, wherein the resource configuration information of the modification request message further indicates another licensed band radio resource of the licensed band, and the transmission assist method further comprises the following step after the step (f):
using the another licensed band radio resource of the licensed band and the unlicensed band radio resource of the unlicensed band to perform carrier aggregation so as to perform the data transmission with the user equipment.

10. The transmission assist method of claim 8, wherein the resource configuration information of the modification request message further indicates a QoS class identifier, and the transmission assist method further comprises the following step after the step (f):
creating a radio bearer with the user equipment through the unlicensed band radio resource according to the QoS class identifier so that the macro cell and the small cell establish dual connectivity with the user equipment by using another licensed band radio resource of the licensed band and the unlicensed band radio resource of the unlicensed band respectively so as to perform the data transmission.

11. A macro cell, comprising:
a transceiver; and
a processor, being electrically connected to the transceiver, and configured to execute the following operations:
- receiving an RLF indication message from a small cell via the transceiver, wherein the RLF indication message is generated by the small cell when determining that an RLF count in a licensed band between the small cell and a user equipment reaches a threshold and the RLF indication message carries the RLF count;
- selecting an unlicensed band radio resource of an unlicensed band according to the RLF indication message and generating a modification request message, wherein the modification request message includes resource configuration information, and the resource configuration information indicates the unlicensed band radio resource of the unlicensed band;
- transmitting the modification request message to the small cell via the transceiver; and
- receiving a modification request acknowledge message from the small cell, wherein the modification request acknowledge message is generated by the small cell when confirming that the unlicensed band radio resource is available for subsequent data transmission with the user equipment.

12. The macro cell of claim 11, wherein the resource configuration information of the modification request message further indicates another licensed band radio resource of the licensed band.

13. The macro cell of claim 11, wherein the resource configuration information of the modification request message further indicates a QoS class identifier.

* * * * *